(12) United States Patent
Sarubbi (10) Patent No.: US 12,039,523 B2
(45) Date of Patent: Jul. 16, 2024

(54) METHODS, DEVICES, AND SYSTEMS FOR INTEGRATION OF ELECTRIC VEHICLE (EV) CHARGING WITH VIRTUAL REALITY AND AUGMENTED REALITY ENVIRONMENTS

(71) Applicant: IoTecha Corp., Cranbury, NJ (US)

(72) Inventor: Kimberly Sarubbi, Brentwood, TN (US)

(73) Assignee: IoTecha Corp., Cranbury, NJ (US)

( * ) Notice: Subject to any disclaimer, the term of this patent is extended or adjusted under 35 U.S.C. 154(b) by 0 days.

(21) Appl. No.: 18/172,632

(22) Filed: Feb. 22, 2023

(65) Prior Publication Data

US 2023/0267451 A1 Aug. 24, 2023

Related U.S. Application Data

(63) Continuation of application No. PCT/US2023/062992, filed on Feb. 22, 2023.

(60) Provisional application No. 63/312,627, filed on Feb. 22, 2022.

(51) Int. Cl.
*G06Q 20/00* (2012.01)
*G06Q 20/36* (2012.01)
*G06Q 50/00* (2012.01)
*H02J 3/32* (2006.01)

(52) U.S. Cl.
CPC ......... *G06Q 20/3678* (2013.01); *G06Q 50/01* (2013.01); *H02J 3/322* (2020.01)

(58) Field of Classification Search
CPC ...... G06Q 20/3678; G06Q 50/01; H02J 3/322

USPC .......................................................... 701/22
See application file for complete search history.

(56) References Cited

U.S. PATENT DOCUMENTS

2021/0157312 A1\* 5/2021 Cella ................... G01M 13/045
2021/0279695 A1 9/2021 Rice

FOREIGN PATENT DOCUMENTS

WO WO-2021108680 A1 \* 6/2021 ............. G05B 17/02

OTHER PUBLICATIONS

ISA/US; International Search Report and Written Opinion for International Patent Application No. PCT/US23/62992 mailed Jun. 8, 2023, 11 pages.

\* cited by examiner

*Primary Examiner* — Tiffany P Young
(74) *Attorney, Agent, or Firm* — NK Patent Law (57) ABSTRACT

Disclosed herein are methods, systems, and devices for integration of electric vehicle (EV) charging with virtual reality (VR) environments and/or augmented reality (AR) environments. In one embodiment, a programmatic method includes receiving a presence indication of an EV user within a proximity of an EV charger during a current charging session of an EV and providing a token to a user account associated with the EV user in response to receiving the presence indication.

30 Claims, 6 Drawing Sheets

METHODS, DEVICES, AND SYSTEMS FOR INTEGRATION OF ELECTRIC VEHICLE (EV) CHARGING WITH VIRTUAL REALITY AND AUGMENTED REALITY ENVIRONMENTS

PRIORITY CLAIM

This application is a continuation application of PCT Patent Application No. PCT/US2023/062992 filed Feb. 22, 2023, which claims the benefit of U.S. Provisional Patent Application Ser. No. 63/312,627 filed Feb. 22, 2022, the entire contents of which are all hereby incorporated herein by reference.

TECHNICAL FIELD

The present invention relates generally to the field of electric vehicle (EV) charging. Additionally, the present invention relates generally to the field of virtual reality (VR) and augmented reality. More particularly, methods, devices, and systems are disclosed for integration of EV charging with AR and VR environments.

BACKGROUND

With the growth of electric vehicles (EVs), the EV charging equipment market is expected to have a compound annual growth rate (CAGR) exceeding 27 percent through 2025. In addition to the public chargers, users are installing home based EV chargers for convenience.

Virtual reality (VR) provides users an immersion into an artificial environment created within one or more computing systems. Augmented reality (AR) provides users overlays of virtual reality (and/or virtual objects) onto their real world environment. Basically, the user's real world is enhanced with virtual reality. Mixed reality provides more than just the overlays, but also anchors virtual reality to the users' real world. Users are allowed to interact simultaneously with both the real world and the virtual world. Many new devices are coming to the market that provide users with affordable access to realistic AR and VR experiences. Like the EV charging equipment market, the VR headset market is expected to have a CAGR exceeding 28 percent through 2028. The AR headset market is anticipated to grow even faster.

Accordingly, there remains a need for methods, devices, and systems for integration of EV charging with AR and VR environments.

SUMMARY

Disclosed herein are methods, systems, and devices for integration of electric vehicle (EV) charging with virtual reality (VR) environments and/or augmented reality (AR) environments. In one embodiment, a programmatic method includes receiving a presence indication of an EV user within a proximity of an EV charger during a current charging session of an EV and providing a token to a user account associated with the EV user in response to receiving the presence indication.

In some embodiments, the programmatic method may further include receiving real world information associated with the EV user and the token may be based on the real world information.

In some embodiments, the real world information may include a current location of the EV user and the current location may be determined from a smart device associated with the EV user and the EV charger.

In some embodiments, the real world information may include weather data, traffic data, current events data, a projected cost of the current charging session, EV information associated with the current charging session, and/or the like.

In some embodiments, the real world information may include other EV user data associated with other EV users determined to be presently located within a first predetermined distance of the EV charger.

In some embodiments, the real world information may include an efficiency of the EV since a previous charging session. In further embodiments, the efficiency of the EV may be based on a distance traveled and an amount of energy consumed by the EV since the previous charging session.

In some embodiments, the programmatic method may further include receiving virtual world information associated with the EV user and the token may be based on the virtual world information.

In some embodiments, the virtual world information associated with the EV user may be further associated with a metaverse having a network of three-dimensional worlds with at least one focus on social connection.

In some embodiments, the virtual world information may include avatar data associated with the EV user.

In some embodiments, the programmatic method may further include receiving historical user information associated with the EV user and the token may be based on the historical use information.

In some embodiments, the historical user information may include status of the EV user in a rideshare program, user purchasing information, user social networking information, user survey information requested during an account registration by the EV user, and/or the like. In further embodiments, the user social networking information may be provided by an Instagram® account, a YouTube® account, a Facebook® account, a Twitter® account, a TikTok® account, a Pinterest® account, a Snapchat® account, and/or the like.

In some embodiments, providing the token to the user account may be further based on an advertisement, a product promotion, a product placement, and/or the like being presented via the EV charger and/or a mobile device associated with the EV user during the current charging session.

In some embodiments, the token may be a non-fungible token (NFT).

In some embodiments, the user account may include a crypto wallet.

In some embodiments, the NFT may be based on a previously issued NFT.

In some embodiments, the NFT may be obtained from an NFT marketplace. In further embodiments, the NFT marketplace may be OpenSea®, Nifty Gateway®, Rarible®, Binance NFT®, SuperRare®, Async Art®, MakersPlace®, KnownOrigin®, Foundation®, Zora®, Mintable®, or the like.

In some embodiments, the NFT is minted within the NFT marketplace in response to receiving the presence indication.

In some embodiments, the NFT marketplace may be associated with EV user groups.

In some embodiments, the NFT marketplace may be associated with EV chargers.

In some embodiments, the NFT marketplace may be associated with promotors of EV chargers.

In some embodiments, the NFT marketplace may be associated with a cause.

In some embodiments, the cause may be a climate change cause, an alternative energy cause, a fair land use cause, a pollution prevention cause, a water access cause, a land conservation cause, an animal rights cause, a recycling cause, an environmental discovery cause, an environmental activism cause, a nuclear proliferation cause, and/or the like.

In some embodiments, the NFT may be associated with a virtual world.

In some embodiments, the virtual world may include Decentraland®, Roblox®, Minecraft®, Fortnite®, Gyoverse®, Dvision Network®, Wilder World®, Realms®, Bigtime®, Miranda®, Pixelynx®, MetaMundo®, Loot®, Cradle® origin of spec, Highstreet®, Dehorizon®, The Sandbox®, Axie Infinity®, Somnium Space®, Star Atlas®, Cryptovoxels®, Aavegotchi®, Treeverse®, Embersword®, Nifly Island®, Bit Country®, and/or the like.

In some embodiments, the NFT may provide ownership to property within the virtual world.

In some embodiments, the NFT may provide access to an event within the virtual world.

In some embodiments, the NFT may provide access to media content within the virtual world.

In some embodiments, the NFT may be configured to be accessed by the EV user via a VR headset.

In some embodiments, the VR headset may be an Oculus Quest® VR headset, an Oculus Quest 2 VR headset, an Oculus Go headset, a Pico Neo® 1 VR headset, a Pico Neo 2 VR headset, a Pico Neo 3 VR headset, a Pico Goblin® 1 VR headset, a Pico Goblin 2 VR headset, an HTC VIVE Focus® VR headset, HTC VIVE Focus Plus VR headset, an HTC VIVE Focus 3 VR headset, or the like.

In some embodiments, the NFT may be configured to be accessed by the EV user via an AR headset. In further embodiments, the AR headset may be a Hololens® 1 AR headset, a Hololens 2 AR headset, and a Magic Leap® 1 AR headset, or the like.

In some embodiments, the NFT may be configured to be accessed by a mobile device associated with the EV user. In further embodiments, the mobile device may be at least one of a smart phone, a smart tablet, a smart watch, a laptop, or the like.

In some embodiments, the NFT may be configured to be accessed by a graphical user interface (GUI) associated with the EV charger.

In another embodiment, a computing device is disclosed for integrating EV charging with VR and AR. The computing device includes a memory and at least one processor configured for receiving a presence indication of an EV user within a proximity of an EV charger during a current charging session of an EV and providing a token to a user account associated with the EV user in response to receiving the presence indication.

In another embodiment, a non-transitory computer-readable storage medium is disclosed for integrating EV charging with VR and AR. The non-transitory computer-readable storage medium stores instructions to be implemented on at least one computing device including at least one processor. The instructions when executed by the at least one processor cause the at least one computing device to perform a method including receiving a presence indication of an EV user within a proximity of an EV charger during a current charging session of an EV and providing a token to a user account associated with the EV user in response to receiving the presence indication.

The features and advantages described in this summary and the following detailed description are not all-inclusive. Many additional features and advantages will be apparent to one of ordinary skill in the art in view of the drawings, specification, and claims presented herein.

DETAILED DESCRIPTION

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 1:
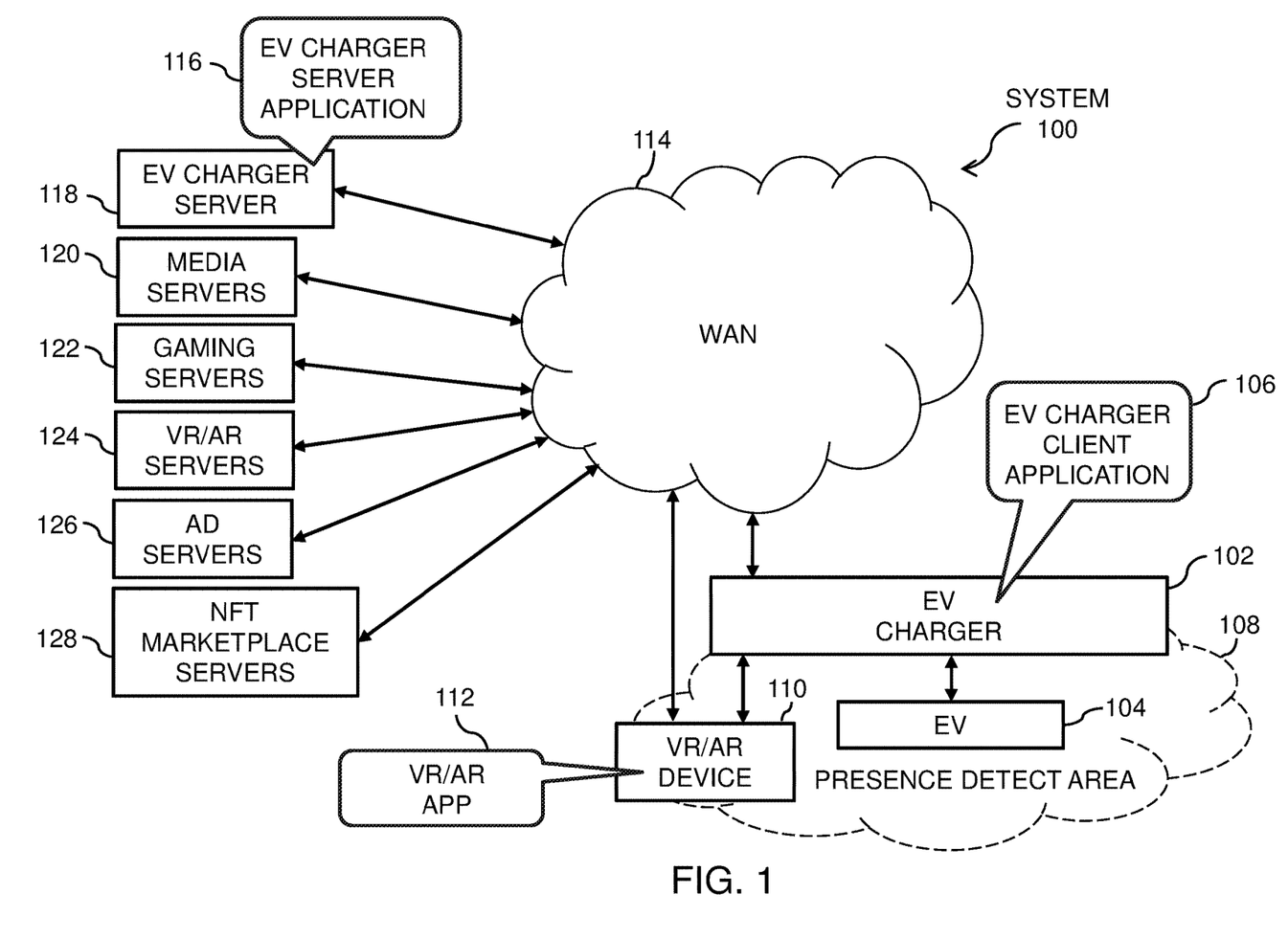
FIG. 1 depicts a block diagram illustrating a system that includes an electric vehicle (EV) charger, a virtual reality (VR)/augmented reality (AR) device, and an EV charger server in accordance with embodiments of the present disclosure.

Disclosed herein are methods, systems, and devices for integration of electric vehicle (EV) charging with virtual reality (VR) environments and augmented reality (AR) environments. In one embodiment, FIG. 1 depicts a block diagram illustrating a system 100 that includes an electric vehicle (EV) charger 102 in accordance with embodiments of the present disclosure. The EV charger 102 provides charging for an EV 104. The EV charger 102 includes an EV charger client application 106. The EV charger client application 106 uses a plurality of sensors within the EV charger 102 to maintain a presence detect area 108. Within the presence detect area 108 the EV charger client application 106 can detect the presence of the EV 104, a VR/AR device 110, a mobile device (not shown in FIG. 1) and/or a user (also not shown in FIG. 1) associated with the EV 104, the VR/AR device 110, and/or the mobile device.

The VR/AR device 110 implements a VR/AR application (App) 112 that is configured to communicate with the EV charger client application 106. The EV charger client application 106 is configured to communicate over a wide area network (WAN) 114 with an EV charger server application 116 executing on an EV charger server 118. The EV charger client application 106 and/or EV charger server application 116 may be configured to communicate with one or more media servers 120, one or more gaming servers 122, one or more VR/AR servers 124, one or more advertising (ad) servers 126, and one or more NFT marketplace servers 128. System 100 provides a platform for many applications of integration of EV charging with VR environments and AR environments.

Figure 2:
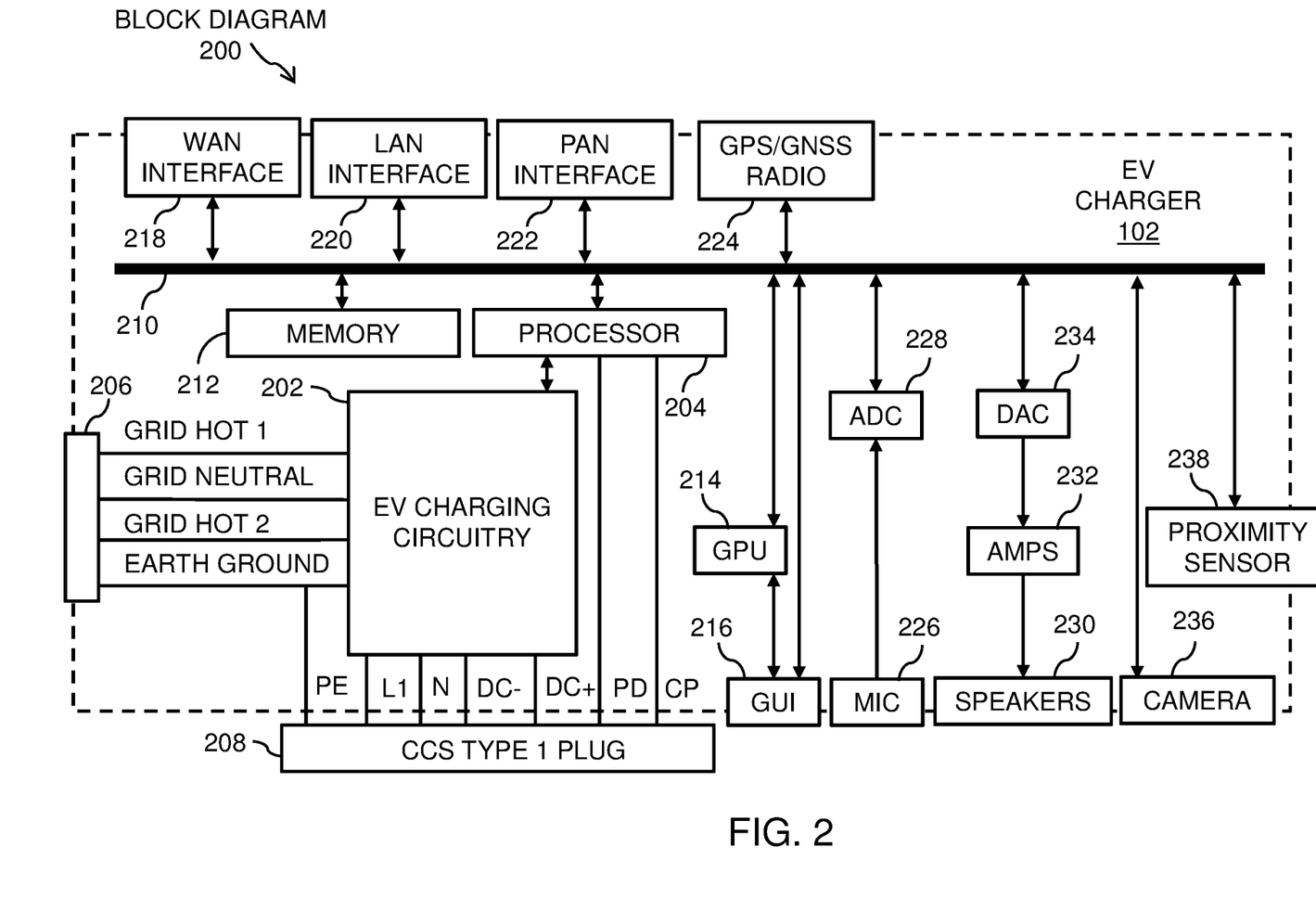
FIG. 2 depicts a block diagram further illustrating one embodiment of the EV charger of FIG. 1 in accordance with embodiments of the present disclosure.

FIG. 2 depicts a block diagram 200 further illustrating one embodiment of the EV charger 102 of FIG. 1 in accordance with embodiments of the present disclosure. The EV charger 102 includes EV charging circuitry 202, a processor 204 electrically coupled with the EV charging circuitry 202, an alternating current (AC) electrical grid interface 206 electrically coupled with the EV charging circuitry 202, and a Combined Charging System (CCS) Type 1 plug 208 electrically coupled with the EV charging circuitry 202. The AC electrical grid interface 206 includes grid hot 1, grid hot 2, grid neutral, and earth ground (i.e. a split-phase grid connection as is commonly known in the art).

The CCS Type 1 plug 208 is configured to be coupled with the EV 104 of FIG. 1. The CCS Type 1 plug 208 is also electrically coupled with the processor 204. The processor 208 is configured to monitor a Proximity Detection (PD) contact to confirm connection to the EV 104. The processor 208 is further configured to monitor a control pilot (CP) contact to maintain a charging rate within a safe operating limit of the EV 104. The EV charging circuitry 204 is configured to provide AC power to the CCS Type 1 plug 120. The EV charging circuitry 202 includes switch circuitry for enabling and/or disabling AC power to the CCS Type 1 plug 120 via a first AC (L1) contact and a second AC (N) contact. The L1 contact and the N contact provide AC power to internal charging circuitry within the EV 104. The switch circuitry may include a relay and the relay may be a solid state relay. The EV charging circuitry 202 may also include an AC-to-DC rectifier for providing DC power to the EV charging interface via a DC+ contact and a DC− contact. The DC+ contact and the DC− contact provide charging current directly to the battery pack of the EV 104 in this scenario. A protective earth (PE) contact of the CCS Type 1 plug 120 is electrically coupled with earth ground of the AC electrical grid interface 206.

The EV charger 102 also includes a bus 120 electrically coupling the processor 204 with a memory 212, a graphical processing unit (GPU) 214, and a graphical user interface (GUI). The bus 120 also electrically couples a WAN interface 218, a local area network (LAN) interface 220, a personal area network (PAN) 222, and a global positioning system and/or global navigation satellite system (GNSS) radio with the processor 204. The WAN interface 218 is configured to communicate with the EV charger server 118 via the WAN 114. In some embodiments, the LAN interface 220 may be configured to indirectly communicate via the WAN 114. The LAN interface 220 may also be configured to communicate with the VR/AR device 110. The GNSS radio 224 facilitates the processor 204 in determining a present location of the EV charger 102. The WAN interface 218 may include 2G, 3G, 4G, and/or 5G technologies. The LAN interface may include Wi-Fi technologies such as 802.11a, 802.11b/g/n, and/or 802.11ac circuitry. The PAN interface may include Bluetooth® technologies.

A microphone (mic) 226 is electrically coupled with the bus 210 via an analog-to-digital converter 228. Speakers 230 are also electrically coupled with the bus 210 via amplifiers (amps) 232 and at least one digital-to-analog converter (DAC) 234. Additionally, a camera 236 and a proximity sensor 238 are electrically coupled with the processor 204 via the bus 210. In some embodiments, the bus 210 may be replaced by multiple buses and/or point-to-point connections.

Figure 3:
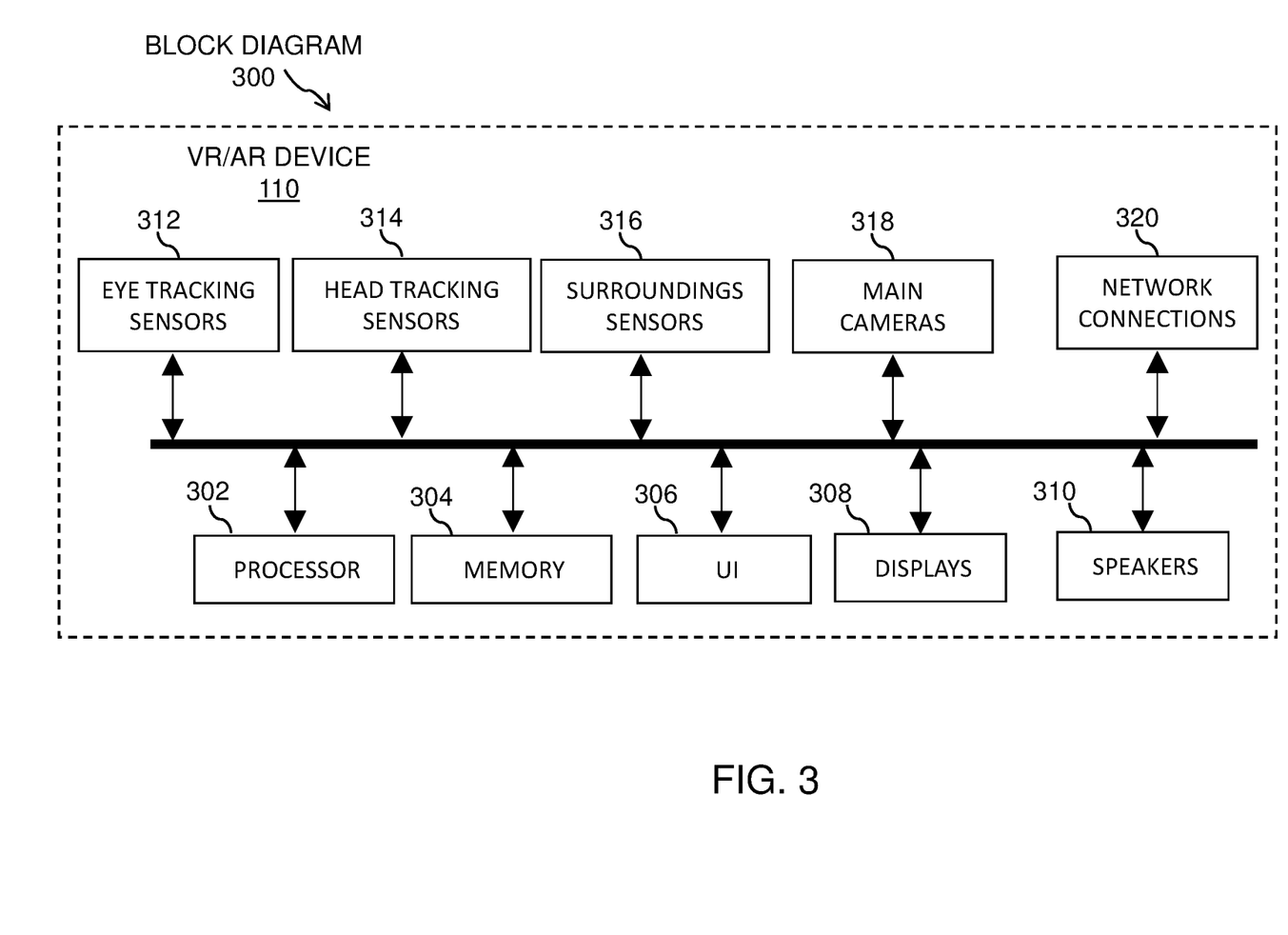
FIG. 3 depicts a block diagram further illustrating one embodiment of the VR/AR device of FIG. 1 in accordance with embodiments of the present disclosure.

FIG. 3 depicts a block diagram 300 further illustrating one embodiment of the VR/AR device 110 of FIG. 1 in accordance with embodiments of the present disclosure. The VR/AR device 110 may include at least a processor 302, a memory 304, a UI 306, a display 308, and speakers 310. The memory 304 may be partially integrated with the processor 302. The memory 304 may include a combination of volatile memory (e.g. random access memory) and non-volatile memory (e.g. flash memory). The UI 306 may include a touchpad display. The displays 308 may include left and right displays for each eye of a user. The speakers 310 may be positioned within the VR/AR device 110. In other embodiments, the speakers 310 may be provided as earbuds or headphones. Connections to the speakers 310 may be wired or wireless (e.g. Bluetooth®).

The VR/AR device 110 may also include eye tracking sensors 312, head tracking sensors 314, surroundings sensors 316, main cameras 318, and network connections 320. The eye tracking sensors 312 may include cameras co-positioned with the displays 308. The head tracking sensors 314 may include a three-axis gyroscope sensor, an accelerometer sensor, a proximity sensor, and/or the like. The surroundings sensors 316 may include cameras positioned at a plurality of angles to view an outward circumference of the VR/AR device 110. The main cameras 318 may include high resolutions cameras configured to provide main left eye and main right eye views to the user.

The network connections 320 may include WAN radios, LAN radios, PAN radios, and/or the like. The WAN radios may include 2G, 3G, 4G, and/or 5G technologies. The LAN radios may include Wi-Fi technologies such as 802.11a, 802.11b/g/n, and/or 802.11ac circuitry. The PAN radios may include Bluetooth® technologies.

In some embodiments, VR/AR device 110 may be a VR headset. For example, the VR/AR device 110 may be an Oculus Quest VR headset, an Oculus Quest 2 VR headset, an Oculus Go headset, a Pico Neo 1 VR headset, a Pico Neo 2 VR headset, a Pico Neo 3 VR headset, a Pico Goblin 1 VR headset, a Pico Goblin 2 VR headset, an HTC VIVE Focus VR headset, HTC VIVE Focus Plus VR headset, an HTC VIVE Focus 3 VR headset or the like.

In other embodiments, VR/AR device 110 may be an AR headset. For example, the VR/AR device 110 may be a Hololens 1 AR headset, a Hololens 2 AR headset, a Magic Leap 1 AR headset, or the like.

Figure 4:
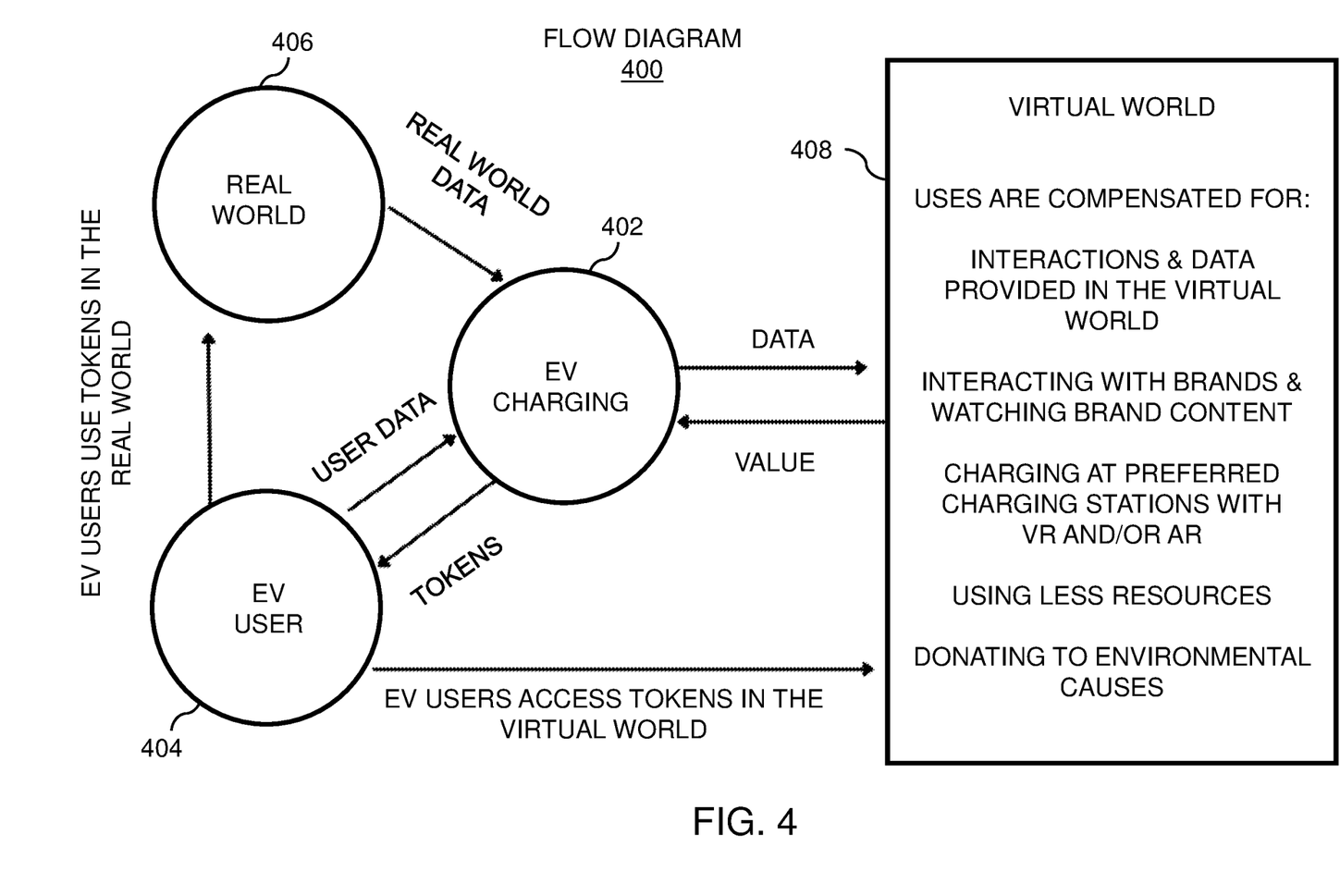
FIG. 4 depicts flow diagram further illustrating integrations of EV charging with an EV user within the real world and a virtual world in accordance with embodiments of the present disclosure.

FIG. 4 depicts a flow diagram 400 further illustrating integrations of EV charging 402 with an EV user 404 within the real world 406 and a virtual world 408 in accordance with embodiments of the present disclosure. In one embodiment, early adopters of an EV charging service may receive a token, such as a non-fungible token (NFT). The NFT may be supported by an Ethereum blockchain. Alternately, the NFT may be supported by a different blockchain having a lower carbon footprint. The NFT may also be compliant to at least one version of a TRC-721 token development and NFT standard. The NFT may provide secure, safe, and high speed payment transaction capabilities over a peer-to-peer decentralized network. The technology may also provide easy trading of the NFT with tracking and recording of transactions with minimal limitations for transfer. Additionally, the NFT may be highly scalable and customizable with smart contract integration and a proof-of-stake consensus mechanism.

In one example, the first 10,000 members that activate subscriptions to an EV charging service may receive one or more NFTs. Additionally, all members may receive one or more additional NFTs when completing EV charging sessions at a preferred location and/or within requested charging times, viewing branded advertisements, and/or completing other requested tasks presented by a provider of an EV charger. For example, the provider may provide the NFT based on a user's overall energy consumption and/or efficiency of their operation of their EV. The provided NFTs may have value in a VR world, within AR applications, and/or an open NFT marketplace. In a VR world the NFTs could be viewable within an art gallery. In an AR application, the same NFT could be presented as artwork on a blank wall or open space in the real world. In some embodiments, the NFTs may also be traded in the VR world or real world for one or more environmental causes (e.g., planting trees, etc.).

Figure 5:
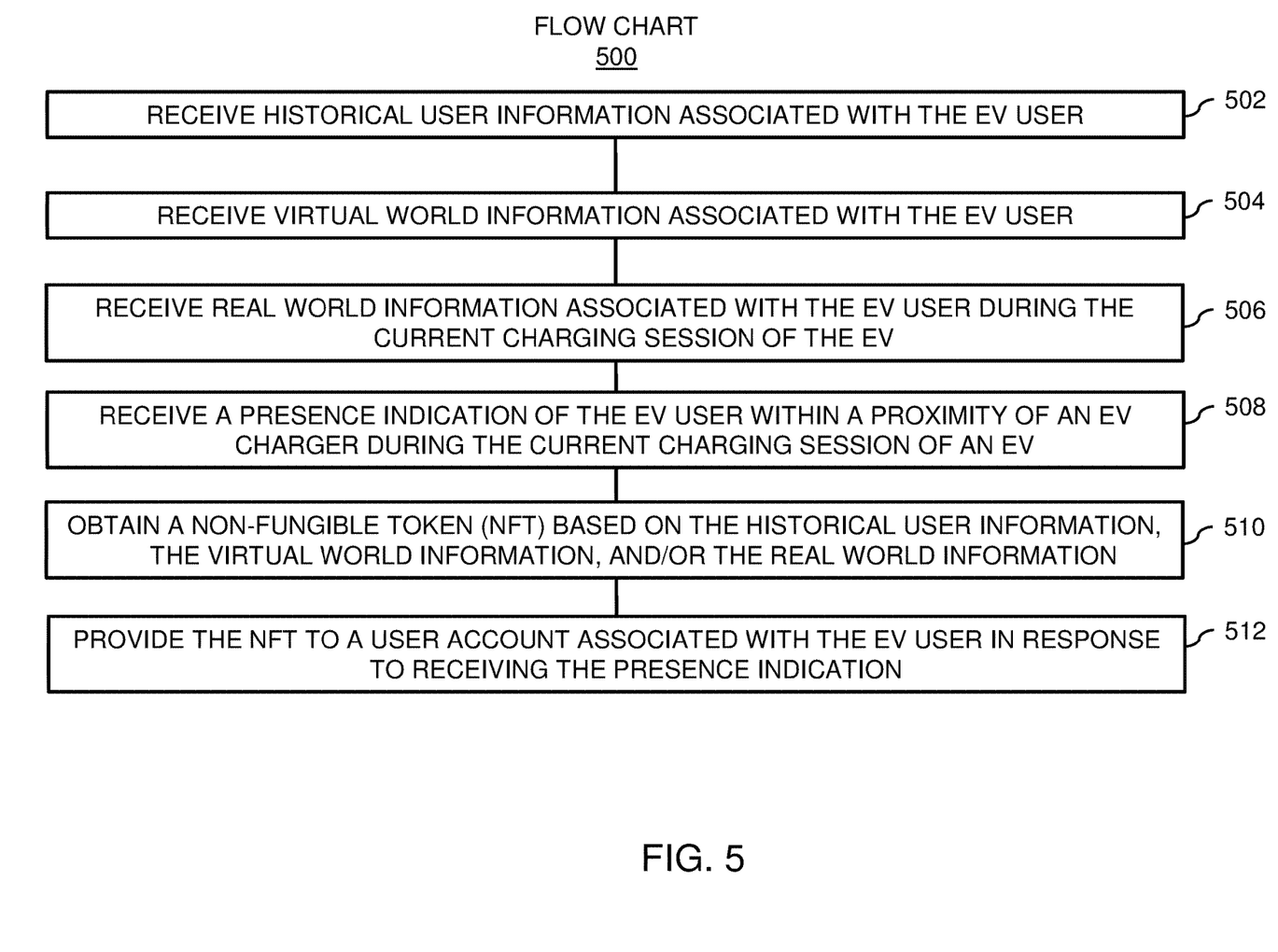
FIG. 5 depicts a flowchart illustrating a programmatic method implemented on at least one computing device for providing a token to an EV user during a current charging session in accordance with embodiments of the present disclosure

FIG. 5 depicts a flowchart 500 illustrating a programmatic method implemented on at least one computing device for providing a token, such as an NFT, to an EV user during a current charging session in accordance with embodiments of the present disclosure.

In step 502, the programmatic method includes receiving historical user information associated with the EV user. The historical user information may include the status of the EV user in a rideshare program, user purchasing information, user social networking information, user survey information requested during an account registration by the EV user, and/or the like. The user social networking information may be provided by an Instagram® account, a YouTube® account, a Facebook® account, a Twitter® account, a TikTok® account, a Pinterest® account, a Snapchat® account, and/or the like.

In step 504, the programmatic method further includes receiving virtual world information associated with the EV user. The virtual world information associated with the EV user may be further associated with a metaverse having a network of three-dimensional worlds with at least one focus on social connection. The virtual world information may include avatar data associated with the EV user.

In step 506, the programmatic method further includes receiving real world information associated with the EV user during the current charging session of the EV 104. The real world information may include a current location of the EV user. The current location may be determined by a mobile device associated with the EV user and/or the EV charger 102. The smart device may be the VR/AR device 110 or another smart device such as a smart phone, a smart tablet, a smart watch, a laptop, or the like. The real world information may also include weather data, traffic data, current events data, a projected cost of the current charging session, an actual cost of a previous charging session, EV information associated with the current charging session, and/or the like. The real world information may further include other EV user data associated with other EV users determined to be presently located within a first predetermined distance of the EV charger. Additionally, the real world information may include an efficiency of the EV since a previous charging session. The efficiency of the EV may be based on a distance traveled and an amount of energy consumed by the EV since the previous charging session. The real world information may further identify the EV user having a status as a "hypermiler."

In step 508, the programmatic method further includes receiving a presence indication of the EV user within proximity of an EV charger 102 during the current charging session of an EV 104. The presence indication may be based on presence detection within the EV charger 102 using the microphone 226, the camera 236, and/or the proximity sensor 238. The presence detection may also be based on the EV charger establishing communication with the VR/AR device 110 and or other mobile device associated with the EV user.

In step 510, the programmatic method further includes obtaining an NFT based on the historical user information, the virtual world information, and/or the real world information. Obtaining the NFT may also be based on an advertisement, a product promotion, a product placement and/or the like being presented via the EV charger 102 or a mobile device associated with the EV user during the current charging session. For example, the mobile device may be a smart phone, a smart tablet, a smart watch, a laptop, or the like.

In step 512, the programmatic method further includes providing the NFT to a user account associated with the EV user in response to receiving the presence indication. The user account may include a crypto wallet. The NFT may be obtained from an NFT marketplace. The NFT marketplace may be OpenSea, Nifty Gateway, Rarible, Binance NFT, SuperRare, Async Art, MakersPlace, KnownOrigin, Foundation, Zora, Mintable, or the like. The NFT may be minted within the NFT marketplace in response to receiving the presence indication or the NFT may be based on a previously issued NFT. The NFT marketplace may be associated with EV user groups, EV charger manufacturers/providers, and/or promotors of EV chargers. The NFT marketplace may be associated with a cause. For example, the cause may be a climate change cause, an alternative energy cause, a fair land use cause, a pollution prevention cause, a water access cause, a land conservation cause, an animal rights cause, a recycling cause, an environmental discovery cause, an environmental activism cause, a nuclear proliferation cause, and/or the like.

The NFT may be associated with a virtual world. For example, the virtual world may include Decentraland®, Roblox®, Minecraft®, Fortnite®, Gyoverse®, Dvision Network®, Wilder World®, Realms®, Bigtime®, Miranda®, Pixelynx®, MetaMundo®, Loot®, Cradle® origin of spec, Highstreet®, Dehorizon®, The Sandbox®, Axie Infinity®, Somnium Space®, Star Atlas®, Cryptovoxels®, Aavegotchi®, Treeverse®, Embersword®, Nifly Island®, Bit Country®, and/or the like. The NFT may provide access to media content within the virtual world and/or to an event within the virtual world.

The NFT may be configured to be accessed by the EV user via the VR/AR device 110, via a GUI provided may a mobile device associated with the user, via a GUI provided by the EV charger 102, and/or the like.

Figure 6:
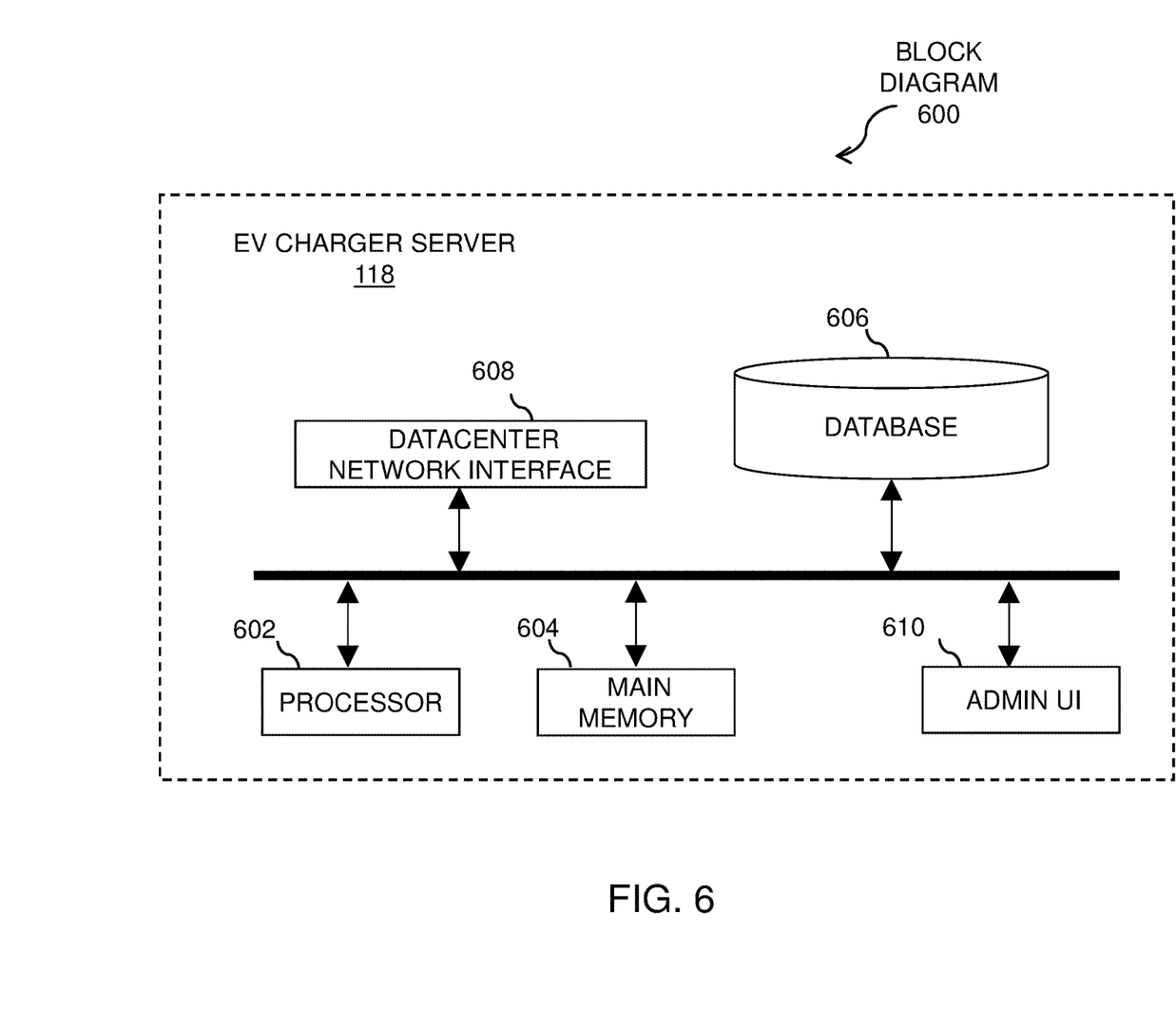
FIG. 6 depicts a block diagram illustrating the EV charger server of FIG. 1 in accordance with embodiments of the present disclosure.

FIG. 6 depicts a block diagram 600 illustrating the EV charger server 118 of FIG. 1 in accordance with embodiments of the present disclosure. The EV charger server 118 includes at least one of processor 602, a main memory 604, a storage memory (e.g., database) 606, a datacenter network interface 608, and an administration user interface (UI) 610. The EV charger server 118 may be configured to host an Ubuntu® server. In some embodiments Ubuntu® server may be distributed over a plurality of hardware servers using hypervisor technology.

The processor 602 may be a multi-core server class processor suitable for hardware virtualization. The processor may support at least a 64-bit architecture and a single instruction multiple data (SIMD) instruction set. The main memory 604 may include a combination of volatile memory (e.g., random access memory) and non-volatile memory (e.g., flash memory). The database 606 may include one or more hard drives. The database 606 may be configured to store at least a portion of a plurality of tokens (e.g., NFTs).

The datacenter network interface 608 may provide one or more high-speed communication ports to the data center switches, routers, and/or network storage appliances. The datacenter network interface 608 may include high-speed optical Ethernet, InfiniBand (IB), Internet Small Computer System Interface (iSCSI), and/or Fibre Channel interfaces. The administration UI may support local and/or remote configuration of the EV charger server 118 by a datacenter administrator.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++, C #, Objective-C, Go, Scala, Swift, Kotlin, OCaml, SAS, Tensorflow, CUDA, or the like. The program code may execute entirely on the user's computer, partly on the user's computer, as a stand-alone software package, partly on the user's computer, and partly on a remote computer or entirely on the remote computer or server. In the latter situation scenario, the remote computer may be connected to the user's computer through any type of network including a PAN, LAN, or WAN, or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A programmatic method implemented on at least one computing device for integrating electric vehicle (EV) charging with at least one of virtual reality (VR) and augmented reality (AR), the programmatic method comprising:
   receiving a presence indication of an EV user within a proximity of an EV charger; and
   providing a non-fungible token (NFT) to a crypto wallet associated with the EV user in response to receiving the presence indication and completing a charging session of an EV, wherein the NFT is minted within an NFT marketplace in response to receiving the presence indication and an efficiency of the EV.

2. The programmatic method of claim 1 further comprising receiving real world information associated with the EV user, wherein the NFT is based on the real world information.

3. The programmatic method of claim 2, wherein:
   the real world information includes a current location of the EV user; and
   the current location is determined from at least one of a smart device associated with the EV user and the EV charger.

4. The programmatic method of claim 2, wherein the real world information includes at least one of weather data, traffic data, current events data, a projected cost of the charging session, and EV information associated with the charging session.

5. The programmatic method of claim 2, wherein the real world information includes other EV user data associated with other EV users determined to be presently located within a first predetermined distance of the EV charger.

6. The programmatic method of claim 2, wherein the real world information includes an efficiency of the EV since a previous charging session.

7. The programmatic method of claim 6, wherein the efficiency of the EV is based on a distance traveled and an amount of energy consumed by the EV since the previous charging session.

8. The programmatic method of claim 1 further comprising receiving virtual world information associated with the EV user, wherein the NFT is based on the virtual world information.

9. The programmatic method of claim 8 wherein the virtual world information associated with the EV user is further associated with a metaverse having a network of three-dimensional worlds with at least one focus on social connection.

10. The programmatic method of claim 8 wherein the virtual world information includes avatar data associated with the EV user.

11. The programmatic method of claim 1 further comprising receiving historical user information associated with the EV user, wherein the NFT is based on the historical use information.

12. The programmatic method of claim 11, wherein the historical user information includes at least one of status of the EV user in a rideshare program, user purchasing information, user social networking information, and user survey information requested during an account registration by the EV user.

13. The programmatic method of claim 1, wherein providing the NFT to the crypto wallet is further based on at least one of an advertisement, a product promotion, and a product placement being presented via at least one of the EV charger and a mobile device associated with the EV user during the charging session.

14. The programmatic method of claim 1, wherein the NFT is based on a previously issued NFT.

15. The programmatic method of claim 1, wherein the NFT marketplace is associated with EV user groups.

16. The programmatic method of claim 1, wherein the NFT marketplace is associated with EV chargers.

17. The programmatic method of claim 1, wherein the NFT marketplace is associated with promotors of EV chargers.

18. The programmatic method of claim 1, wherein the NFT marketplace is associated with a cause.

19. The programmatic method of claim 18, wherein the cause is at least one of a climate change cause, an alternative energy cause, a fair land use cause, a pollution prevention cause, a water access cause, a land conservation cause, an animal rights cause, a recycling cause, an environmental discovery cause, an environmental activism cause, and a nuclear proliferation cause.

20. The programmatic method of claim 1, wherein the NFT is associated with a virtual world.

21. The programmatic method of claim 20, wherein the NFT provides ownership to property within the virtual world.

22. The programmatic method of claim 20, wherein the NFT provides access to an event within the virtual world.

23. The programmatic method of claim 20, wherein the NFT provides access to media content within the virtual world.

24. The programmatic method of claim 20, wherein the NFT is configured to be accessed by the EV user by at least one of a VR headset and an AR headset.

25. A computing device for integrating electric vehicle (EV) charging with at least one of virtual reality (VR) and augmented reality (AR), the computing device comprising:
 a memory; and
 at least one processor configured for:
  receiving a presence indication of an EV user within a proximity of an EV; and
  providing a non-fungible token (NFT) to a crypto wallet associated with the EV user in response to receiving the presence indication and completing a charging session of an EV, wherein the NFT is minted within an NFT marketplace in response to receiving the presence indication and an efficiency of the EV.

26. The programmatic method of claim 1, wherein the efficiency of the EV is based on a distance traveled and an amount of energy consumed by the EV since a previous charging session.

27. The programmatic method of claim 1, wherein the NFT is minted within the NFT marketplace further response to an overall energy consumption of the EV user.

28. A non-transitory computer-readable storage medium, the non-transitory computer-readable storage medium storing instructions to be implemented on at least one computing device including at least one processor, the instructions when executed cause the at least one computing device to perform a programmatic method for integrating electric vehicle (EV) charging with at least one of virtual reality (VR) and augmented reality (AR), the programmatic method comprising:
 receiving a presence indication of an EV user within a proximity of an EV;
 providing a non-fungible token (NFT) to a crypto wallet associated with the EV user in response to receiving the presence indication and completing a charging session of an EV, wherein the NFT is minted within an NFT marketplace in response to receiving the presence indication and an efficiency of the EV.

29. The programmatic method of claim 24, wherein the NFT is further configured to be accessed by a mobile device associated with the EV user.

30. The programmatic method of claim 24, wherein the NFT is further configured to be accessed by a graphical user interface (GUI) associated with the EV charger.

* * * * *